United States Patent
Schmidt et al.

(10) Patent No.: US 10,088,081 B2
(45) Date of Patent: Oct. 2, 2018

(54) HYDRAULIC CONNECTING BUSH, HYDRAULIC CONNECTION, AND HYDRAULIC PLUG

(71) Applicant: ABB TECHNOLOGY AG, Zurich (CH)

(72) Inventors: Matthias Schmidt, Frankfurt (DE); Joachim Bohlaender, Grosskrotzenburg (DE)

(73) Assignee: ABB Schweiz AG, Baden (CH)

( * ) Notice: Subject to any disclaimer, the term of this patent is extended or adjusted under 35 U.S.C. 154(b) by 386 days.

(21) Appl. No.: 14/655,742

(22) PCT Filed: Nov. 28, 2013

(86) PCT No.: PCT/EP2013/074929
§ 371 (c)(1),
(2) Date: Jun. 26, 2015

(87) PCT Pub. No.: WO2014/106551
PCT Pub. Date: Jul. 10, 2014

(65) Prior Publication Data
US 2015/0377393 A1    Dec. 31, 2015

(30) Foreign Application Priority Data
Jan. 2, 2013    (DE) .................. 10 2013 000 014

(51) Int. Cl.
*F16L 21/02*    (2006.01)
*F16L 17/06*    (2006.01)
(Continued)

(52) U.S. Cl.
CPC ............. *F16L 21/022* (2013.01); *F16L 17/06* (2013.01); *F16L 21/002* (2013.01); *F16L 55/1141* (2013.01)

(58) Field of Classification Search
CPC ....... F16L 21/022; F16L 21/002; F16L 17/06; F16L 55/1141
(Continued)

(56) References Cited

U.S. PATENT DOCUMENTS 3,997,198 A * 12/1976 Linder ...................... 285/351 X
5,165,704 A    11/1992 Schaeper et al.
(Continued)

FOREIGN PATENT DOCUMENTS

DE    914803 C    7/1954
DE    1295936 B    5/1969
(Continued)

OTHER PUBLICATIONS

Freudenberg Simrit; GmbH & Co. KG, Technisches Handbuch 2007, Technische Grundlagen; O-Ringe und statistische Dichtungen; Dec. 2009, p. 563.
(Continued)

*Primary Examiner* — Greg Binda
*Assistant Examiner* — Zachary T Dragicevich
(74) *Attorney, Agent, or Firm* — Leydig, Voit & Mayer, Ltd.

(57) ABSTRACT

A hydraulic connecting bush for correcting hydraulic lines for hydraulic circuit-breaker drives, having a hollow cylindrical main body with at least two annular grooves, extending circumferentially on the main body outer cylindrical surface and having sealing rings inserted therein, the main body being made of a material having a first elasticity modulus. The bush may be configured for overlapping insertion in hydraulic lines to be connected, in contact with each other at end faces, the hydraulic lines being made of a material having a second elasticity modulus, a gap forming between, the main body and the hydraulic lines, such that if the first elasticity modulus is less than the second elasticity (Continued)

modulus, and an internal pressure is applied, the main body expands more than the hydraulic lines and closes the gap in the region of the sealing rings.

12 Claims, 4 Drawing Sheets

(51) Int. Cl.
  *F16L 55/11* (2006.01)
  *F16L 21/00* (2006.01)
(58) Field of Classification Search
  USPC .................. 285/95, 336, 345, 351, 352, 379
  See application file for complete search history.

(56) References Cited

U.S. PATENT DOCUMENTS

| | | | |
|---|---|---|---|
| 5,704,399 A * | 1/1998 | Hayashi | |
| 5,944,319 A * | 8/1999 | Kohlman | |
| 6,106,030 A * | 8/2000 | Nader | |
| 7,407,165 B1 * | 8/2008 | Chisnell | F16L 21/02 285/351 X |
| 7,484,770 B2 * | 2/2009 | Hamada | 285/336 X |
| 2004/0084902 A1 * | 5/2004 | Smith, III | 285/379 |
| 2010/0066077 A1 * | 3/2010 | Sharma | F16L 21/022 |
| 2013/0038028 A1 * | 2/2013 | Jack | F16L 21/022 |

FOREIGN PATENT DOCUMENTS

| | | |
|---|---|---|
| DE | 4324362 A1 | 1/1995 |
| DE | 102010046383 A1 | 3/2012 |
| EP | 2385276 A1 | 11/2011 |
| GB | 2415233 A | 12/2005 |

OTHER PUBLICATIONS

Parker Seals, "O-Ring Handbook", Parker Hannifin GmbH & Co. KG, Jan. 30, 2013, pp. 36-37.

* cited by examiner

HYDRAULIC CONNECTING BUSH, HYDRAULIC CONNECTION, AND HYDRAULIC PLUG

CROSS-REFERENCE TO RELATED APPLICATIONS

This application is a U.S. national stage application under 35 U.S.C. § 371 of International Application No. PCT/EP2013/074929, filed on Nov. 28, 2013, and claims benefit to German Patent Application No. DE 10 2013 000 014.9, filed on Jan. 2, 2013. The International Application was published in German on Jul. 10, 2014, as WO 2014/106551 A1 under PCT Article 21 (2).

FIELD

The invention relates to a hydraulic connecting bush for connecting hydraulic lines.

BACKGROUND

A connection of hydraulic lines may be implemented by way of various constructive solutions. For example, a seal having axially sealing annular seals is known. A further possibility exists in the use of connecting bushes having radially sealing annular seals. In this embodiment, annular seals are usually inserted into radial grooves of the connecting bushes, wherein the annular seals are in most cases supported by annular supports, as will be described hereunder.

In the event of an intensely pulsating pressure, the known connecting methods cannot ensure a sealing function or can only be fitted in a laborious manner. The first applies to axially sealing annular seals; they cannot ensure a sealing function in the event of high or intensely pulsating pressures. It has proven unfavorable in the case of connecting bushes with radially sealing annular seals that the latter can be fitted only in a laborious manner. The sealing faces of the pressure lines may be easily damaged during fitting. This caused by the hard bush easily being able to contact the sealing faces of the pressure lines. In order for the connecting bush to be able to be inserted without causing damage, a gap is provided between said bush and the hydraulic line. However, an annular seal may be extruded into this gap. Extrusion means that an annular seal is urged into a gap on the low-pressure side and is thus destroyed, on account of which a sealing function of the connection is no longer ensured. In order to avoid extruding the annular seal, as well as the annular seals, annular supports are additionally inserted into the annular grooves in the case of the connecting bushes of the prior art, which annular supports at least reduce the respective gap in the region around the groove and thus prevent extruding. However, it has proven disadvantageous that an additional fitting effort is required for fitting the annular supports. It is furthermore disadvantageous that the annular supports may be forgotten during fitting or be incorrectly fitted. On account of the mentioned disadvantages, connecting bushes having axially sealing annular seals are to some extent susceptible to defects during fitting, resulting in a susceptibility to defects of the connection during operation.

Similar disadvantages also present themselves in hydraulic plugs of the prior art. Hydraulic plugs are inserted into open hydraulic lines and close the latter. In a comparable manner to hydraulic connecting bushes, hydraulic plugs are also made of a cylindrical main body having at least one annular groove which encircles the external sleeve face thereof and in which in each case also one annular seal is inserted. In the prior art, annular supports are also inserted in the case of hydraulic plugs on the low-pressure side ahead of the annular seal, preventing extruding of the annular seal. As opposed to the cylindrical main body of a hydraulic connecting bush, the cylindrical main body of a hydraulic plug is closed on one end side in order to avoid leakage of the hydraulic medium. Hydraulic plugs must be fixed in the axial direction in relation to the hydraulic line, so as to fix said hydraulic plugs also in the event of the hydraulic line being impinged with internal pressure.

SUMMARY

An aspect of the invention provides a hydraulic connecting bush for connecting hydraulic lines for hydraulic power switch drives, the hydraulic connecting bush comprising: a hollow-cylindrical main body including at least two annular grooves, the grooves encircling an external sleeve face of the main body, and the grooves including an annular seal, inserted in respective annular groove, wherein the main body includes a first material having a first elasticity modulus, wherein the hydraulic connecting bush is configured to be insertable in an overlapping manner into hydraulic lines mutually abutting at their end sides to be connected, the hydraulic lines including a second material having a second elasticity modulus, wherein a gap is formed between the main body and the hydraulic lines, wherein the first elasticity modulus is lower than the second elasticity modulus, such that, when impinged with an internal pressure, the main body is widened more than the hydraulic lines, wherein the main body is an injection-molded part including a plastic, or the main body is a metal bush insert-molded in a plastic, wherein, when the hydraulic connecting bush is inserted into the hydraulic lines, the hydraulic lines each enclose at least one of the annular seals, on account of which a sealing effect results independently of system pressure, wherein the main body, when impinged with a hydraulic pressure of from 50 bar, is widened such that the gap is closed, whereby the annular seals cannot be extruded into the gap even at low pressure.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
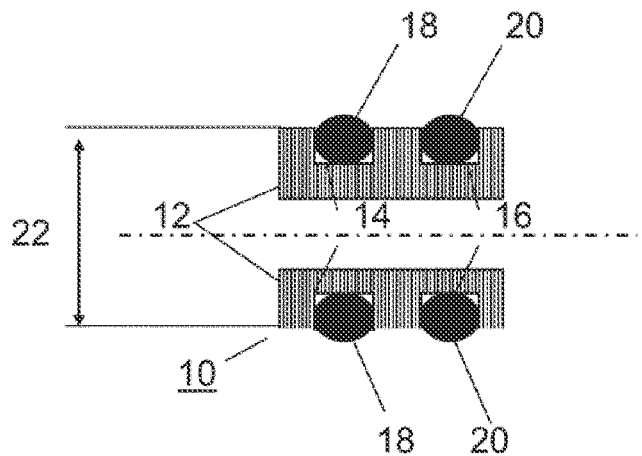
FIG. 1 shows an exemplary hydraulic connecting bush.

The invention relates to a hydraulic connecting bush for connecting hydraulic lines, for example for hydraulic power switch drives, comprising a hollow-cylindrical main body having at least two annular grooves which encircle the external sleeve face of said main body and have annular seals which are inserted in said annular grooves. Moreover, the invention relates to a hydraulic connection comprising at least one first and one second hydraulic line for power switch drives, having a connecting bush according to the invention, wherein the hydraulic line is made of a material having a second elasticity modulus and wherein the connecting bush is inserted in an overlapping manner into the hydraulic lines which at their end sides mutually abut. Additionally, the invention relates to a hydraulic plug for closing an open hydraulic line, for example for hydraulic power switch drives, comprising a cylindrical main body which is formed from a first hollow-cylindrical region and an axially adjacent second cylindrical closure region. The main body additionally comprises an annular groove which encircles the first hollow-cylindrical region.

An aspect of the invention provides a hydraulic connecting bush or a hydraulic connection, respectively, which ensures a sealing function also in the event of high and pulsating pressures but is easier to fit. An aspect of the invention provides a hydraulic plug which ensures a sealing function also in the event of high and pulsating pressures and, moreover, is easy to fit.

An aspect of the invention provides a hydraulic connecting bush of the type mentioned at the outset. Said hydraulic connecting bush is characterized in that the main body is made of a material having a first elasticity modulus and the hydraulic connecting bush is provided so as to be inserted in an overlapping manner into the hydraulic lines which at their end sides mutually abut, are to be connected and which are of a material having a second elasticity modulus, wherein a gap is formed between the main body and the hydraulic lines, such that in the case of a lower elasticity modulus of the first material in comparison with the elasticity modulus of the second material, when impinged with an internal pressure, the main body is widened more than the hydraulic lines, on account of which the gap in the region of the annular seals is closed. On account thereof, the annular seals cannot be pushed into the gap and are thus protected from damage, on account of which a lasting sealing effect is achieved. The gap between the main body and the hydraulic lines cannot be dispensed with for reasons of fitting.

Departing from the prior art, the annular supports are no longer required in the hydraulic connecting bush according to the invention. Instead, a hydraulic connecting bush which widens under pressure and which replaces the previous connecting bush and additionally assumes the function of the annular supports is provided. Therefore, the use of annular supports may advantageously be dispensed with, on account of which fitting errors are precluded and complexity is reduced.

On account of a suitable choice of the elasticity moduli of the main body and the comprising hydraulic lines, widening of the hydraulic connecting bush is caused under impingement with internal pressure and a gap for reasons of fitting between the hollow-cylindrical main body and the internal sleeve face of the hydraulic line is closed or at least reduced to the extent that an annular seal cannot be extruded into this gap and thus be damaged. The main body is widened so as to close the gap only once impinged with a certain pressure, for example with a hydraulic pressure of more than 50 bar. The gap between the main body and the hydraulic line is therefore conceived so as to be constructed so tight that an annular seal cannot be extruded into the gap even at low pressure.

A correspondingly low pressure acts on the annular seal per se, as well as on the main body in the event of a low hydraulic pressure. In this case, the annular seal is sufficiently retained in the annular groove and thus is not extruded into the gap which in this case is comparatively large. Increasing hydraulic pressure causes an increase in the pressure acting on the annular seal per se, as well as on the main body. The pressure acting on the annular seal urges the latter in the direction of the gap. Under all pressure conditions the main body is widened to the extent that the gap is always sufficiently small so as to prevent the annular seal from extruding. Overall, a reliable sealing effect is therefore caused both at very low pressure as well as at very high pressure. The annular supports which to date have been required may here be dispensed with.

According to one advantageous variant, the axes of the annular grooves of the hydraulic connecting bush are disposed so as to be congruent. On account of this specific design embodiment, two hydraulic lines can be connected so as to be in alignment with one another, and the end sides of the hydraulic lines can be directly flanged to one another. The hollow-cylindrical main body is made of a material having a sufficiently high elongation at rupture, such that damage is avoided even in the event of repeatedly being brought to bear on the hydraulic lines.

Furthermore advantageously, the hollow-cylindrical main body is made of a plastics material. Since the pressure lines which comprise the main body according to the invention are made of a harder material, usually a metal, in most cases a higher surface hardness of the material is also a given. Damage to the internal sleeve faces of the pressure lines on account of the main body being inserted is thus avoided. The plastics material has a chemical resistance which optionally has been adapted by additives and additionally offers freedom in the constructive design of the main body.

According to a further advantageous variant, the hollow-cylindrical main body is made of an erosion-resistant material, for example polyamide. On account thereof, it is prevented that the flowing hydraulic medium dissolves or erodes the main body during operation. This in turn contributes toward a long operational life of the hydraulic connection.

According to the invention it is optionally provided that the hollow-cylindrical main body is made as a metal bush insert-molded in a plastics material. On account of an inserted metal bush, the main body is more stable and the resistance to mechanical stress byway of the flowing fluid is increased. Additionally, a directionally biased material behavior of the main body may be achieved on account of insert-molding using a plastics material.

According to one advantageous variant, the hollow-cylindrical main body is made as an injection-molded part, on account of which the main body may be manufactured with little complexity as a volume product. On account of this production method, an adequate surface finish may be achieved, ideally from the outset, so as not to require additional post-processing.

Preferably, standardized annular seals are used as annular seals. On account of the use of standardized parts, the overall connection can be manufactured in a particularly simple manner. Advantageously, the annular grooves of the hollow-cylindrical main bodies are produced such that the standardized annular seals bear in the annular grooves at a specific tensile stress and, on account thereof, are securely retained.

According to one advantageous design embodiment, the surface of the hollow-cylindrical main body is processed so as to be smooth; on account thereof, the surface roughness is reduced according to requirements. In particular, the surface roughness of the bearing face of the annular seal in the annular groove is to be designed such that a tight connection is caused between the annular seal and the annular groove. For example, grinding, polishing, honing, lapping, or finishing may be employed as a smoothing surface treatment.

A hydraulic connecting bush according to the invention is outstandingly suitable for hydraulic connections of power switch drives. A hydraulic connection of this type comprises at least one first and one second hydraulic line for power switch drives, and a connecting bush. The hydraulic line is made of a material having a second elasticity modulus, and the connecting bush is inserted in an overlapping manner into the hydraulic lines which at their end sides mutually abut, wherein a gap is formed between the main body and the hydraulic lines. Here the first and the second hydraulic line in each case enclose at least one annular seal. On account of this embodiment, a sealing effect results independently of the system pressure, on account of the enclosed annular seals. The connecting bush comprises a hydraulic connecting bush as has already been described, in which the first material of the hollow-cylindrical main body has a lower elasticity modulus than the second material of the hydraulic lines. On account of a suitable choice of the elasticity moduli, greater widening of the hollow-cylindrical main body than of the hydraulic lines results when the hydraulic connection is impinged with an internal pressure, on account of which bearing of the main body on the hydraulic lines is achieved. In this case, the gap in the region of the inserted annular seals is closed, and the annular seals thus cannot be extruded into the gap. The annular supports required to date can thus be dispensed with. This results in simpler fitting, on account of which the risk of fitting errors is significantly reduced. Since fewer parts have to be fitted and thus also fewer parts are in operation, higher operational reliability additionally results.

Advantageously, the elasticity moduli of the first and of the second material are selected in such a manner that a ratio of the elasticity moduli at which the external sleeve face of the main body is at least partially brought to bear on the internal sleeve face of the hydraulic lines when the hydraulic connection is impinged with internal pressure is established. Bearing of the main body is particularly caused on the bearing faces which in the direction of extent are in each case disposed so as to be inward of the annular seals, such that said main body can assume the function of the annular supports.

According to an application according to the intended use, the hydraulic connecting bush is in each case inserted in an overlapping manner into an end-side bore of the hydraulic lines, wherein the respective bore is disposed so as to be coaxial in relation to the respective hydraulic line. The hydraulic connecting bush has to be inserted so as to be overlapping in such a manner that each bore covers at least one annular seal. On account of the bores which are coaxially disposed, uniform pressure on the hydraulic lines and thus in turn uniform counter-pressure on the hollow-cylindrical main body result when the main body comes to bear.

Advantageously, the internal diameter of the respective bore of the hydraulic lines is adapted to the external diameter of the hydraulic connecting bush. Adapting the diameter means that the clearance between the external and the internal diameter has to be selected to be of a size such that the hydraulic connecting bush can be introduced into the respective bore of the hydraulic lines without damage. Additionally, adapting means that the tolerances between diameters are to be dimensioned to be so narrow that that the main body is widened and brought to bear also at a low system pressure, for example at 50 bar, on account of which extruding of an annular seal is prevented.

Preferably, the bore of the respective hydraulic line has a chamfer. In order to prevent damage during fitting, pulling the annular seals over sharp edges should be avoided. Therefore, chamfers or ramps having an exemplary angular range of 10° to 40° in relation to the axial direction of extent are to be provided on the bores and on the further edges. Sharp edges which are created by other recesses, for example by additional bores, are preferably to be designed such that the annular seals are not damaged.

In one advantageous embodiment of the hydraulic connection, at least one of the hydraulic lines is formed by a hydraulic duct of a power switch drive. Hydraulic ducts of power switch drives are typically made of steel or another metal, and have a higher elasticity modulus than the hydraulic connecting bush which is to be comprised. On account of this preferred embodiment, using one type of hydraulic connecting bushes, two hydraulic lines as well as directly a hydraulic duct of a power switch drive can be connected to a hydraulic line.

Moreover, the object presented is achieved by a hydraulic plug of the type mentioned at the outset. This is characterized in that the main body is made of a material having a first elasticity modulus, and in that the hydraulic plug is provided so as to be inserted into an open hydraulic line of a material having a second elasticity modulus, wherein a gap between the main body and the hydraulic line is formed. In the case of a lower elasticity modulus of the second material, when impinged with an internal pressure, the main body is caused to widen more than the hydraulic line, on account of which the gap in the region of the annular seal is closed when the internal pressure is sufficiently high. Closing of the gap is caused in particular in the region between the annular seal and the cylindrical closure region, preventing extruding of the annular seal. In order to prevent the hydraulic plug being pushed out of the hydraulic line, the former is provided so as to be fixed at least in the axial direction in relation to the hydraulic line.

The main body which comprises the first hollow-cylindrical region and the axially adjacent second closure region is made from a monolithic workpiece. On account of the embodiment of the cylindrical main body having a first hollow-cylindrical region, the main body is developed so as to have a thin wall in the region of the encircling annular groove. On account of the thin wall of the first hollow-cylindrical region, a comparatively low internal pressure is sufficient to cause the main body to be brought to bear. Reliable bearing and thus protection of the annular seal against extruding is thus also caused at low internal pressure.

In a further embodiment, the first region of the main body is embodied so as to be solid-cylindrical. In this case, the hydraulic medium, when impinged with internal pressure, acts on that end face of the main body that faces the hydraulic line. On account of being axially fixed, the main body when stressed by this pressure cannot yield in the axial direction. On account of the approximately constant volume of the material under deformation, a radial expansion of the main body is therefore inevitably caused. This expansion in turn has the effect of closing the gap between the main body and the hydraulic line and protecting the annular seal which is inserted in the annular groove from damage.

On account of the solid-cylindrical embodiment of the first region, a solid main body which is simple to produce and fit is manufactured. Axial fixing of the main body in the end-side bore may be implemented by a direct screw connection between the main body and the hydraulic line, for example. A further exemplary constructive solution lies in screwing the hydraulic line to a termination plate.

FIG. 1 shows a hydraulic connecting bush 10, comprising a main body 12 having at least two annular grooves 14, 16 which encircle the external sleeve surface of said main body 12 and have annular seals 18, 20 which are inserted in said annular grooves 14, 16.

One possibility is for the groove geometry to be conceived as per the prior art. In the figure illustrated, the annular cross section of the annular seals 18, 20 projects beyond the annular grooves 14, 16 by an exemplary amount of 10 to 20%, so as to ensure a minimum compression bias in the installed state. However, it is also conceivable for the annular cross sections of the annular seals 18, 20 to project farther, for example in order to obtain a very high compression bias. In order for a uniform contact pressure of the annular seals 18, 20 to develop, it may be advantageous for all annular seals 18, 20 to uniformly project beyond the annular grooves 14, 16 and to thus be uniformly compressed with bias.

For reasons of clarity in the drawing, the edges of the main body 12 are not illustrated in the figure so as to be chamfered. However, as has already been discussed, ramps and chamfers should be provided in order for the annular seals 18, 20 not to be damaged when being inserted.

The material of the main body 12 of the hydraulic connecting bush 10 and of the annular seal 18, 20 is to be chosen such that it is resistant to the hydraulic medium to be sealed at the prevalent temperature ranges, for example between −40° C and +70° C. Therefore, plastics materials may be employed, for example. The surface roughness of the main body 12 of the hydraulic connecting bush 10 is to be chosen such that a sealing effect is caused between the annular seal 18, 20 and the respective annular groove 14, 16 of the main body 12.

Figure 2:
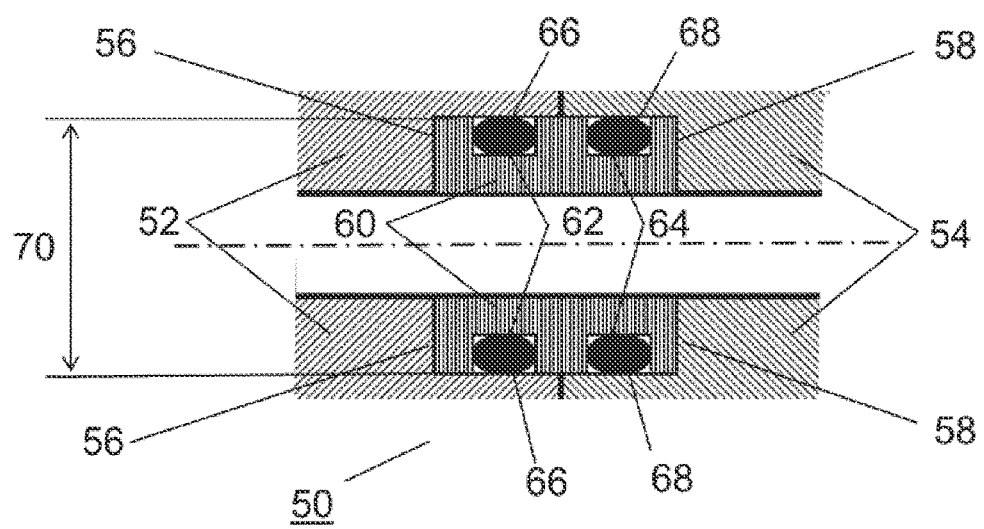
FIG. 2 shows an exemplary hydraulic connection.

FIG. 2 shows a hydraulic connection 50, having hydraulic lines 52, 54 which abut one another at the end side and which in each case have end-side bores 56, 58, wherein the main body 60 of a hydraulic connecting bush, having inserted annular seals 66, 68, is inserted in an overlapping manner into the end-side bores 56, 58. A screw connection (not illustrated in the drawing) may be used for the end-side connection of the hydraulic lines 52, 54, for example. Since the sealing effect is caused by way of the annular seals 66, 68, a tight hydraulic connection 50 would still exist even in the case of lifting-off taking place at the end side.

The hydraulic connecting bush, when correspondingly impinged with pressure, at least partially bears on the comprising hydraulic lines 52, 54. The region between the annular seals 66, 68 completely bears on the hydraulic lines 52, 54 and is supported by them. On account of the hydraulic connecting bush completely bearing between the annular rings, excessive widening and thus damage to the main body 60 is prevented.

End-side bores 56, 58 are incorporated in the hydraulic lines 52, 54, as is illustrated in the figure. The main body 60 of the hydraulic connecting bush is in this case axially fixed in the bases of the bores 56, 58. However, it is also conceivable for the bores 56, 58 to be dispensed with and to secure the main body 60 of the hydraulic connecting bush in the hydraulic lines 52, 54 in the axial direction by way of projecting cams. On account of the pressure differential prevalent between the pressure in the hydraulic line 52, 54 and the atmospheric pressure which is prevalent between the annular seals 66, 68, bearing of the hydraulic connecting bush between the bores is also caused without fixation.

The bearing face between the end side of the main body 60 and the bases of the bores 56, 58 is to be chosen so as to be sufficiently large to prevent the main body 60 being released from the comprising bores 56, 58 during operation. The surface roughness in the annular groove 62, 64 and on the bearing faces of the annular seals 66, 68 is decisive for the functioning of the hydraulic connection 50. The surface roughness has to be chosen such that the annular seals 66, 68 reliably seal but are not damaged by excessive roughness.

In the constructive concept care additionally has to be taken that the annular seals 66, 68 bear with minimum compression on the internal sleeve faces of the hydraulic lines 52, 54, so as to achieve sufficient compression bias even at low hydraulic pressure. Total compression of the annular seal 66, 68 during operation is composed of the static compression bias plus compression which is a result of the hydraulic system pressure. The proportion of compression resulting from the system pressure depends inter alia on the geometry of the respective annular groove 62, 64.

The ratio of the first and the second elasticity modulus has a relevant influence on widening. The material of the hollow-cylindrical main body 60 of the hydraulic connecting bush is to be chosen such that the material has a lower elasticity modulus than the second material of the hydraulic lines 52, 54, such that greater widening of the hollow-cylindrical main body 60 than of the hydraulic lines 52, 54 is caused when the hydraulic connection 50 is impinged with internal pressure. The hollow-cylindrical main body 60 is already expanded and bears on the hydraulic lines 52, 54 at low pressures. On account thereof, the gap between the main body 60 and the hydraulic lines 52, 54 is closed, and extruding of the annular seal 66, 68 into the gap behind the seal is avoided.

In order for damage to the hydraulic lines 52, 54 to be avoided when the main body 60 is introduced, the latter moreover has to have a lower surface hardness. Normally, this is a given on account of the use of a plastics material as the material for the main body, as is demanded according to the invention. Additionally, a sufficient elongation at break of the material of the main body is required, in order for the main body to be able to be sufficiently widened and bear on the hydraulic line 52, 54, without being damaged. Additionally, the material of the main body 60 has to be sufficiently resistant to erosion, so as not to be eroded by the flowing hydraulic medium. The requirements mentioned may be met by various plastics materials.

Figure 3:
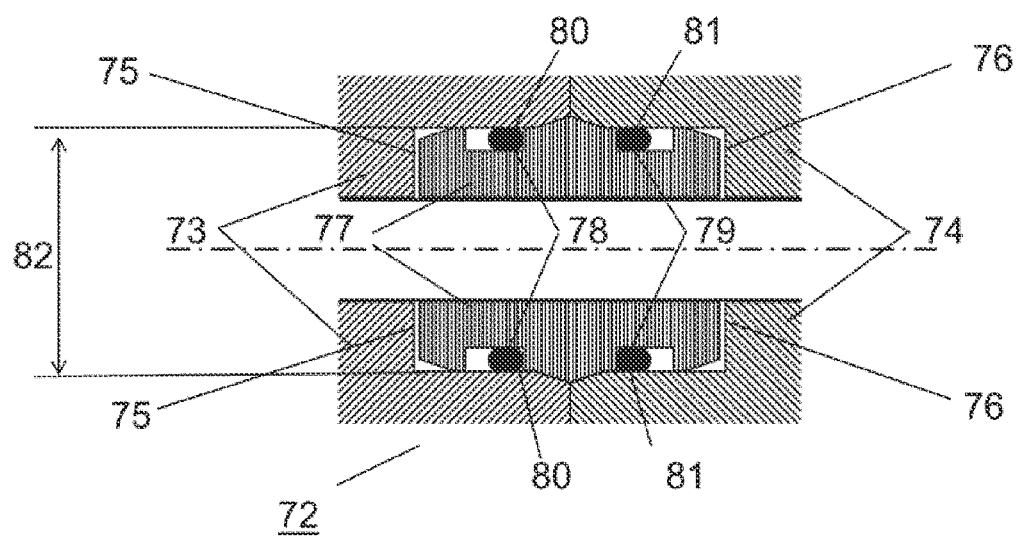
FIG. 3 shows a further exemplar hydraulic connection.

FIG. 3 shows a further preferred embodiment of the hydraulic connection 72. The hydraulic lines 73, 74 again abut one another at the end side, having in each case end-side bores 75, 76, wherein the main body 77 of a hydraulic connecting bush having inserted annular seals 80 81, is inserted in an overlapping manner into the end-side bores 75, 76.

A chamfer which is longitudinal to the rotation axis of the main body 77 is provided on the end-side bores 75, 76 of the respective hydraulic line 73, 74. On account of the respective chamfer, damage to the annular seals 80, 81 is avoided when the hydraulic connecting bush is introduced. After the hydraulic lines 73, 74 have been joined together at the end sides, a groove-shaped recess in the form of the mutually mated chamfers is created on the internal sleeve face. The main body 77, at least between the annular seals 80, 81, is adapted to the mutually mated hydraulic lines 73, 74. On account thereof, said main body 77 is caused to completely bear on the hydraulic lines 73, 74 between the annular seals 80, 81, on account of which damage is avoided during widening.

A gap is provided between the respective end side of the main body 77 and the respective base of the end-side bores 75, 76. A hydraulic medium thus flows up to the outer side of the respective annular seal 80, 81. The effective face for the pressure differential which is formed is thus the sleeve face of the main body 77 between the annular seals 80, 81.

Figure 4:
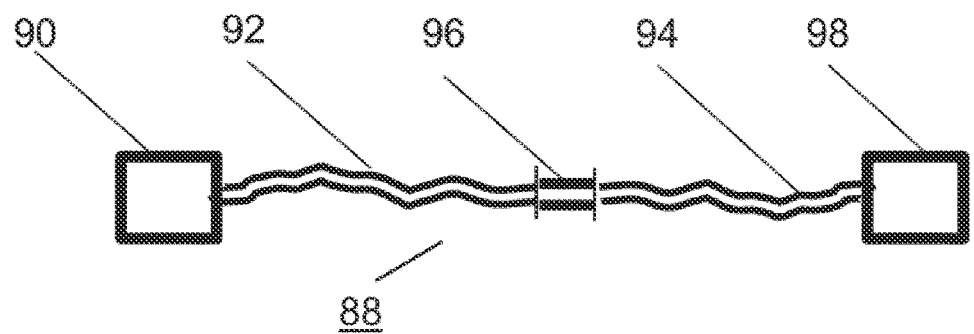
FIG. 4 shows an exemplary hydraulic system.

FIG. 4, in an exemplary manner, shows the most important components of an exemplary hydraulic system 88. The hydraulic system 88 comprises a hydraulic source 90, from which a hydraulic line 92 branches off, and, as a hydraulic sink, a power switch drive 98, from which in turn a hydraulic line 94 branches off. The two hydraulic lines 92, 94 are interconnected by way of a hydraulic connection 96 according to the invention.

All commercially available annular seals which are resistant to the high operational pressure and to the hydraulic medium may be used. Hydraulic connections typically have an external diameter in a range between 10 mm and 50 mm, and a length between 30 and 100 mm; however, dimensions which deviate therefrom are also conceivable.

Figure 5:
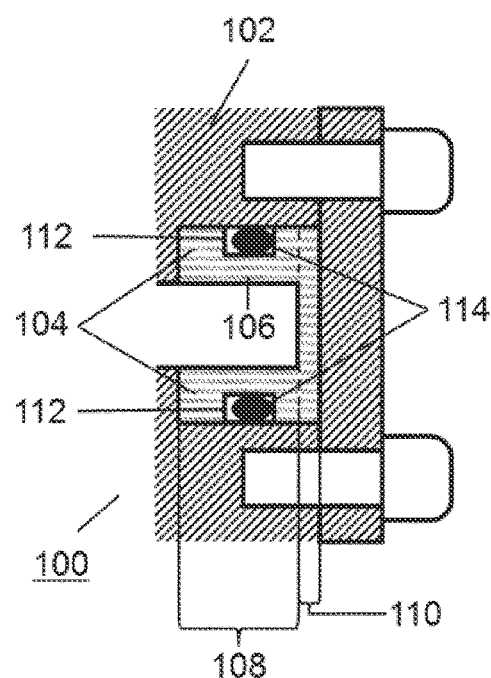
FIG. 5 shows an exemplary hydraulic plug.

FIG. 5 shows an exemplary hydraulic plug 100. The hydraulic plug 100 has a monolithic main body 106 which comprises a first hollow-cylindrical region 108 and an axially adjacent second cylindrical closure region 110. This type of embodiment leads to the illustrated thin wall of the illustrated main body 106 in the hollow-cylindrical region 108, which is comparable to the thin-walled region of the hydraulic connecting bush. The thin wall in turn causes the external sleeve face of the main body 106 to bear on the internal sleeve face of the hydraulic line 102, even at low internal pressure. The annular groove 112 encircles the first hollow-cylindrical region 108.

In the illustrated figure, the hydraulic line 102 in the axial direction is screwed at its end side to a terminal plate, on account of which the main body 106 in the axial direction is fixed in relation to the hydraulic line.

Figure 6:
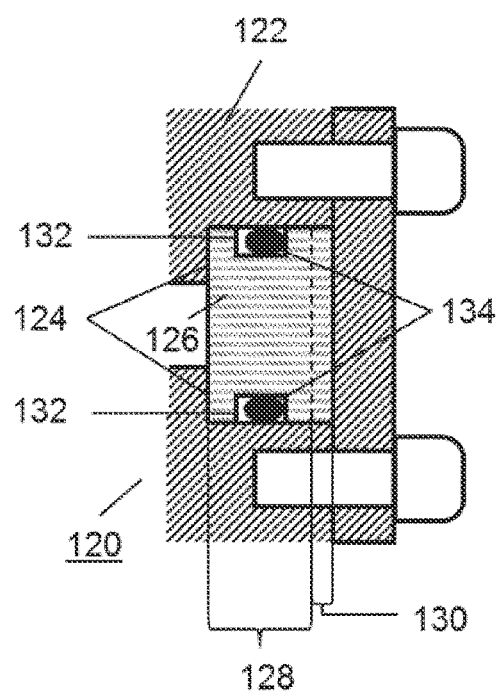
FIG. 6 shows a further exemplary hydraulic plug.

FIG. 6 shows a further exemplary hydraulic plug, in which the intrinsically hollow-cylindrical region 128 of the main body 126 is embodied so as to be solid-cylindrical. On account of the solid-cylindrical embodiment of the region 128, the internal pressure acts on that end side of the main body 126 that faces the hydraulic line 122. An annular groove in which an annular seal 134 is inserted is sunk into the main body 126 around the region 128. The main body 126 having the inserted annular seal 134, in turn is inserted in the end-side bore 124 of the hydraulic line 122. A plate which at the end side is screwed to the hydraulic line 126 fixes the main body 126 in the axial direction.

Figure 7:
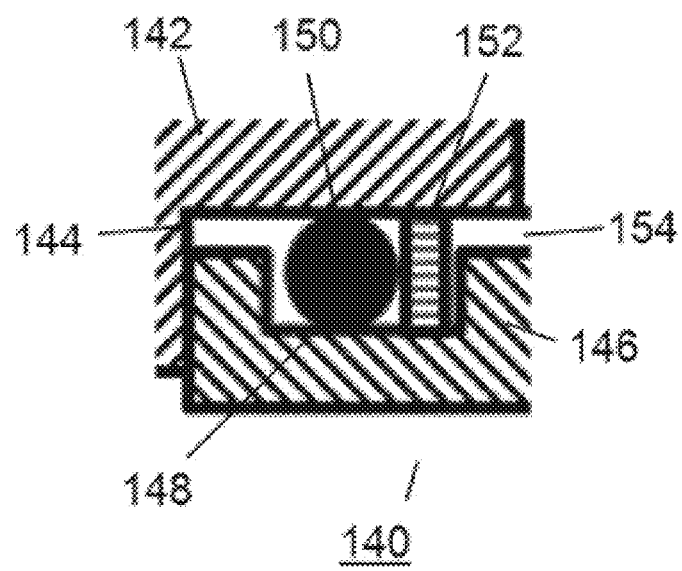
FIG. 7 shows a detail of a hydraulic connecting bush of the prior art.

FIG. 7 shows a detail of the region around the annular seal of a hydraulic connecting bush or of a hydraulic plug of the prior art, in a detail diagram 140. A main body 146 of a hydraulic connecting bush is inserted into the end-side bore 144 of the hydraulic line 142. An annular seal 150 is inserted into the annular groove 148 of the main body. For reasons of fitting, a gap 154 is present between the hydraulic line 142 and the main body 146. The annular support 152 is placed ahead of the annular seal 150 in the annular groove 148 and prevents extruding of the annular seal 150 into the low pressure-side gap 154.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE SIGNS

10 First hydraulic connecting bush
12 First main body
14 First annular groove of the first main body
16 Second annular groove of the first main body
18 First annular seal of the first main body
20 Second annular seal of the first main body
22 External diameter of the hydraulic connecting bush
50 Exemplary hydraulic connection
52 First hydraulic line
54 Second hydraulic line
56 First end-side bore
58 Second end-side bore
60 Second main body
62 First annular groove of the second main body
64 Second annular groove of the second main body
66 First annular seal of the second main body
68 Second annular seal of the second main body
70 Diameter of bores
72 Exemplary second hydraulic connection
73 Third hydraulic line
74 Fourth hydraulic line
75 Third end-side bore
76 Fourth end-side bore
77 Third main body
78 Third annular groove of the third main body
79 Fourth annular groove of the third main body
80 Third annular seal of the third main body
81 Fourth annular seal of the third main body
82 Diameter of bores
88 Exemplary hydraulic system
90 Hydraulic source
92 Third hydraulic line
94 Fourth hydraulic line
96 Hydraulic connection
98 Hydraulic power switch drive
100 Exemplary first hydraulic plug
102 Third hydraulic line
104 Third end-side bore
106 Fourth main body 108 Hollow-cylindrical region
110 Cylindrical closure region
112 Annular groove of the fourth main body
114 First annular seal of the fourth main body
120 Exemplary second hydraulic plug
122 Fourth hydraulic line
124 Fourth end-side bore
126 Fifth main body
128 Hollow-cylindrical region
130 Cylindrical closure region
132 Annular groove of the fifth main body
134 First annular seal of the fifth main body
140 Detail of a hydraulic connection of the prior art
142 Fifth hydraulic line
144 Fifth end-side bore
146 Sixth main body
148 Annular groove of the sixth main body
150 First annular seal of the sixth main body
152 Annular support
154 Gap between the fifth hydraulic line and the sixth main body

The invention claimed is:

1. A hydraulic connection, comprising:
a first hydraulic line configured for a power switch drive;
a second hydraulic line configured for a power switch drive; and
a connecting bush including a hollow-cylindrical main body including at least two annular grooves, the grooves encircling an external sleeve face of the main body, and the grooves including an annular seal inserted in respective annular grooves,
wherein the hydraulic lines include a second material having a second elasticity modulus,
wherein the connecting bush is inserted in an overlapping manner into the hydraulic lines which, at their end sides, mutually abut,
wherein an annular gap is formed between the external sleeve face of the main body and an inner surface of the hydraulic lines when the connecting bush is inserted in the hydraulic lines,
wherein the main body of the connecting bush includes a first material having a first elasticity modulus,
wherein the first elasticity modulus is lower than the second elasticity modulus, such that when the hydraulic connection is impinged with an internal pressure, the main body widens more than the hydraulic lines,
wherein the main body comprises an injection-molded part including a plastic or a metal bush insert-molded in a plastic,
wherein each hydraulic line encloses at least one of the annular seals, resulting in a sealing effect independently of system pressure, and
wherein the main body, when impinged with a hydraulic pressure of from 50 bar, is widened relative to the hydraulic lines such that the gap is closed in a region of the annular seals, whereby the annular seals cannot be extruded into the gap even when the pressure falls below 50 bar.

2. The hydraulic connection of claim 1, wherein axes of the annular grooves are congruent.

3. The hydraulic connection of claim 1, wherein the main body includes an erosion-resistant material.

4. The connection of claim 1, wherein a bore of each hydraulic line includes a chamfer which is longitudinal to a rotation axis of the main body.

5. The connection of claim 1, wherein at least one of the hydraulic lines is formed by a hydraulic duct of a power switch drive.

6. The hydraulic connection of claim 1, wherein the main body comprises an injection-molded part including a plastic.

7. The hydraulic connection of claim 1, wherein the main body comprises a metal bush insert-molded in a plastic.

8. The hydraulic connection of claim 1, wherein the main body includes a polyamide.

9. The hydraulic connection of claim 1, wherein the main body consists essentially of the first material.

10. The hydraulic connection of claim 1, wherein the hydraulic lines consist essentially of the second material.

11. The connection of claim 1, wherein the main body is made of the first material.

12. The connection of claim 1, wherein the hydraulic lines are made of the second material.

* * * * *